(12) United States Patent
Yamao

(10) Patent No.: US 9,841,353 B2
(45) Date of Patent: Dec. 12, 2017

(54) ENGINE TEST APPARATUS INCLUDING WHEELED CARRIAGE FOR CARRYING ENGINE

(71) Applicant: MEIDENSHA CORPORATION, Tokyo (JP)

(72) Inventor: Yoshihiro Yamao, Fukaya (JP)

(73) Assignee: MEIDENSHA CORPORATION, Tokyo (JP)

( * ) Notice: Subject to any disclaimer, the term of this patent is extended or adjusted under 35 U.S.C. 154(b) by 337 days.

(21) Appl. No.: 14/400,754

(22) PCT Filed: May 21, 2013

(86) PCT No.: PCT/JP2013/064001
§ 371 (c)(1),
(2) Date: Nov. 12, 2014

(87) PCT Pub. No.: WO2013/176099
PCT Pub. Date: Nov. 28, 2013

(65) Prior Publication Data
US 2015/0177102 A1      Jun. 25, 2015

(30) Foreign Application Priority Data

May 23, 2012   (JP) .................................. 2012-117095

(51) Int. Cl.
*G01M 15/00* (2006.01)
*G01M 15/02* (2006.01)

(52) U.S. Cl.
CPC .................................. *G01M 15/02* (2013.01)

(58) Field of Classification Search
USPC ............... 73/116.01, 116.02, 116.03, 116.04, 73/116.05, 116.06
See application file for complete search history.

(56) References Cited

U.S. PATENT DOCUMENTS 4,912,970 A * 4/1990 Gicewicz .......... G01M 17/0074
73/116.01
4,986,119 A * 1/1991 Gicewicz .......... G01M 17/0074
73/146
(Continued)

FOREIGN PATENT DOCUMENTS

CN        2496686 Y    6/2002
CN     201429504 Y    3/2010
(Continued)

OTHER PUBLICATIONS

Korean Office Action dated May 23, 2016, 6 pages.
Chinese Office Action and English Language translation dated Jun. 27, 2016, 17 pages. App. No. 201380026556.1.

*Primary Examiner* — Eric S McCall
(74) *Attorney, Agent, or Firm* — Foley & Lardner LLP

(57) ABSTRACT

In an engine test apparatus of a type to stop a carriage carrying an engine, by pressing a wheel of the carriage to a rail, the wheel and rail may be damaged if the wheel is pressed strongly. An engine test apparatus 1 is arranged to perform an engine performance test by moving a carriage 2 carrying an engine, along a rail 3, to the position of a dynamometer. Carriage 2 comprises a base 11 supporting the engine, casters 12~45 attached to base 11, and a fixing portion 17 to position and fix base 11 on the rail. Casters 12~15 include a spring 19 to be compressed when the base is fixed by the fixing portion.

14 Claims, 12 Drawing Sheets

(56) References Cited

U.S. PATENT DOCUMENTS

| | | | | |
|---|---|---|---|---|
| 5,238,126 A * | 8/1993 | Rindoks | ............... | B25H 1/0007 |
| | | | | 206/319 |
| 5,600,059 A * | 2/1997 | Sondey | ................ | G01M 15/02 |
| | | | | 198/346.1 |
| 5,629,476 A * | 5/1997 | Sondey | ................ | G01M 15/02 |
| | | | | 248/219.3 |
| 5,816,367 A * | 10/1998 | Lilja | ..................... | F01D 25/285 |
| | | | | 187/244 |
| 6,485,247 B1 * | 11/2002 | Groves | .................... | B64F 5/50 |
| | | | | 180/125 |
| 7,000,460 B1 * | 2/2006 | Cline | ................... | G01M 15/02 |
| | | | | 73/116.03 |

FOREIGN PATENT DOCUMENTS

| | | | |
|---|---|---|---|
| JP | 59-069062 U | 5/1984 | |
| JP | 6-305509 A | 11/1994 | |
| JP | 7-119744 A | 5/1995 | |
| JP | 08-082577 A | 3/1996 | |
| JP | 2000-64619 A | 2/2000 | |
| JP | 3035439 B2 | 4/2000 | |
| JP | 2003-312810 A | 11/2003 | |
| JP | 2006-152690 A | 6/2006 | |
| JP | 3814478 B2 | 8/2006 | |

\* cited by examiner

ENGINE TEST APPARATUS INCLUDING WHEELED CARRIAGE FOR CARRYING ENGINE

TECHNICAL FIELD

The present invention relates to an engine test device or apparatus to convey an engine mounted on a carriage or cart along rails to the position of a dynamometer, to perform an engine performance test.

BACKGROUND ART

FIG. 15 shows a known engine test apparatus. In this engine test apparatus 101, a dynamometer 102 is mounted on a mounting base (support base) 103 which is equipped with a handle 104 for pushing by hand. Rails 106 are laid on a floor 105. At a lower portion of the mounting base 103, there are provided wheels 108 through hydraulic cylinders 107. Furthermore, there are provided guide rollers 109 engaging with rails to prevent running off the rails.

At the time to move the mounting base 103, the wheels 108 are pushed down by the hydraulic cylinders 107 and projected downwards from the lower end of mounting base 103. Therefore, when the handle 104 is pushed by hand, the mounting base 103 is moved along rails 106 with the wheel 108 rolling on rails 106 and the guide rollers 109 moving in engagement with rails 106. After the movement of mounting base 103, the wheels 108 are withdrawn, the lower end of mounting base 103 is placed on the rails 106 or the floor 105, an engine (not shown) is connected, and a test of the engine is performed. (Patent Document 1)

PRIOR ART LITERATURE

Patent Document(s)

Patent Document 1: JP H08-82577 A (paragraph 0004)

SUMMARY OF THE INVENTION

Problem to be Solved by the Invention

The above-mentioned conventional engine test apparatus is constructed to set the mounting base 103 in the movable state by pushing the wheels 108 downward to project from the lower end of mounting base 103, with the hydraulic cylinders 107, and to fix the mounting base 103 by withdrawing the wheels 108 with hydraulic cylinders 107 and placing the mounting base 103 on the rails 106 or the floor 105. Accordingly, this engine test apparatus encounters following problems.

(1) The use of hydraulic cylinders 107 causes a cost increase of the engine test apparatus.

(2) Although the mounting base can be moved straight ahead without no special problem, it is difficult to change the traveling direction of mounting base 103 from the straight ahead direction, to a perpendicular direction, for example, and to move the mounding base 103 in the changed direction.

(3) Despite guide rollers 109 for preventing running off, the conventional engine test apparatus is unable to hold the positional relationship between the rails and the mounting base 103 during travel of the carriage because there is a play (clearance for movement) between the wheels 108 and the rails 106.

In other words, even if the dynamometer is mounted on the mounting base by a preparing operation so that the axis of dynamometer 102 is set at the position adjusted to the center axis of an engine to be tested, there arises a deviation or undesired shift in the positional relationship between the mounting base and the rails during movement along the rails. Therefore, a readjusting operation is required for adjusting the alignment of the axes before the connection between the dynamometer and the engine.

The present invention is devised to solve the problems of the above-mentioned conventional example, to eliminate the need for the hydraulic cylinders, and to provide an engine test apparatus to improve the ease and reliability even in the case of changing the traveling direction especially from a straight ahead direction to a perpendicular direction.

Means for Solving the Problem

In an engine test apparatus, according to the present invention, for performing an engine performance test by moving a carriage on which an engine is mounted, along rails, to a position of a dynamometer, the carriage is provided with: a base supporting the engine, a caster attached to the base, and a fixing portion to position and fix the base on the rails, and the caster is provided with an elastic member to be compressed when the base is fixed by the fixing portion.

A wheel of the caster is a spherical wheel in a form of a sphere, and the spherical wheel is attached rotatably through a wheel holder to the base. Each of the left and right rails enabling movement of the carriage is provided with a rail groove to receive the spherical wheel, and the rail groove of one of the left and right rails includes left and right side walls formed with sloping surfaces so arranged that the wheel of the spherical shape inserted in the rail groove contacts with each of the sloping surfaces.

Effect of the Invention (1) In the engine test apparatus according to certain embodiments, the fixing portion is brought to a free state at the time of moving the carriage. The carriage can be moved by pushing and turned to change the direction readily, with rotation and rolling motion of a wheel. Furthermore, at the time of positioning and fixing the base, the base is fixed to the rail's side by fastening the fixing portion to the rail etc. with screw fastener etc. In this case, the elastic member contracts and causes the wheel to move upwards with respect to the base. By so doing, the elastic member mitigates the fastening force and protects the wheel and rail.

(2) In the engine test apparatus according to certain embodiments, a spherical body is used as a wheel. Therefore, the movement and the direction change can be achieved by rotation and rolling motion of the spherical body.

(3) In the engine test apparatus according to certain embodiments, with the spring force of the elastic member disposed between a base attaching portion and a wheel holding portion, the elastic member holds constant the distance between the base attaching portion and the wheel holding portion in the free state of the fixing portion. At the time of fixing the fixing portion to the rail etc. with the screw fastener etc., the elastic member is compressed in a direction to reduce the distance between the wheel holding portion and the base attaching portion, and hence the elastic member causes the wheel to move upwards with respect to the base and protects the wheel and rail.

(4) In the engine test apparatus according to certain embodiments, with the casters provided at the four corners of the base on the front and rear sides and the. left and right sides, the base can be moved stably.

(5) In the engine test apparatus according to certain embodiments, the base is in the form of a rectangular frame having an open portion at the center, so that it is possible to prevent reflection of sounds etc. at that portion.

(6) In the engine test apparatus according to certain embodiments, each of the left and right rails includes a rail groove to receive a lower part of the wheel which has a spherical shape, and the rail groove of one of the left and right rails includes left and right side walls formed with sloping surfaces so arranged that the wheel of the spherical shape inserted in the rail groove contacts with each of the sloping surfaces. Therefore, the spherical wheel moves in the rail groove in the state in which the spherical wheel is sandwiched and positioned between the left and right side walls.

(7) In the engine test apparatus of according to certain embodiments, the rails are provided in an anechoic chamber for performing a test of the engine in an anechoic space. The engine can be conveyed to the positon of the dynamometer smoothly in the narrow anechoic chamber with the structure capable of changing the direction of the base readily.

MODE(S) FOR CARRYING OUT THE INVENTION

Figure 1:
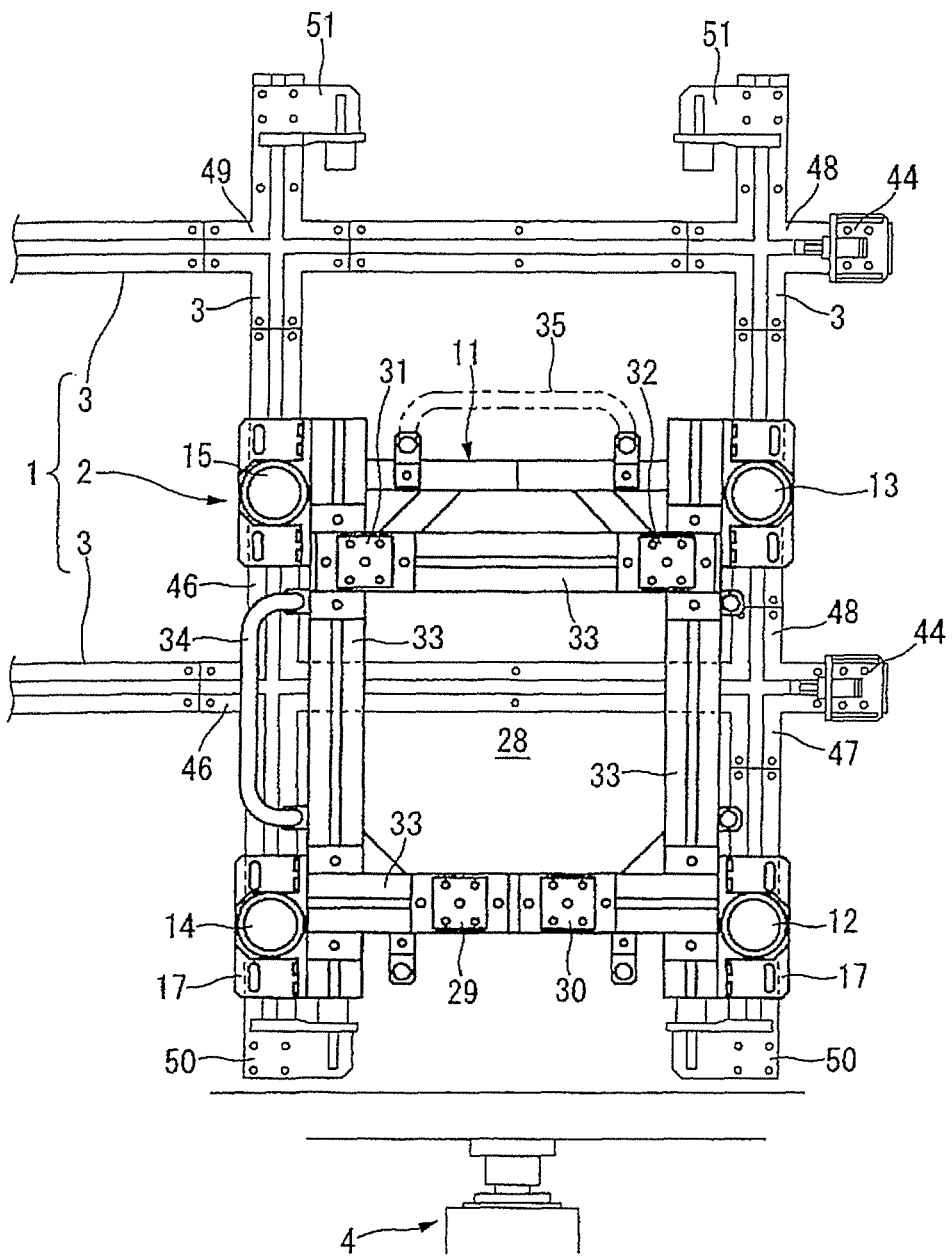
FIG. 1 is a plan view of a carriage.
Figure 2:
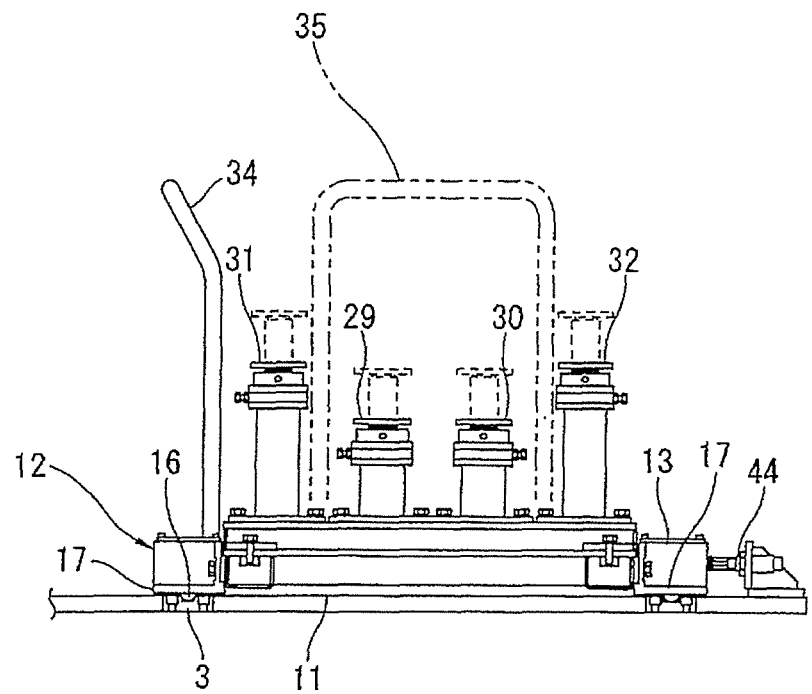
FIG. 2 is a front view of the carriage.
Figure 3:
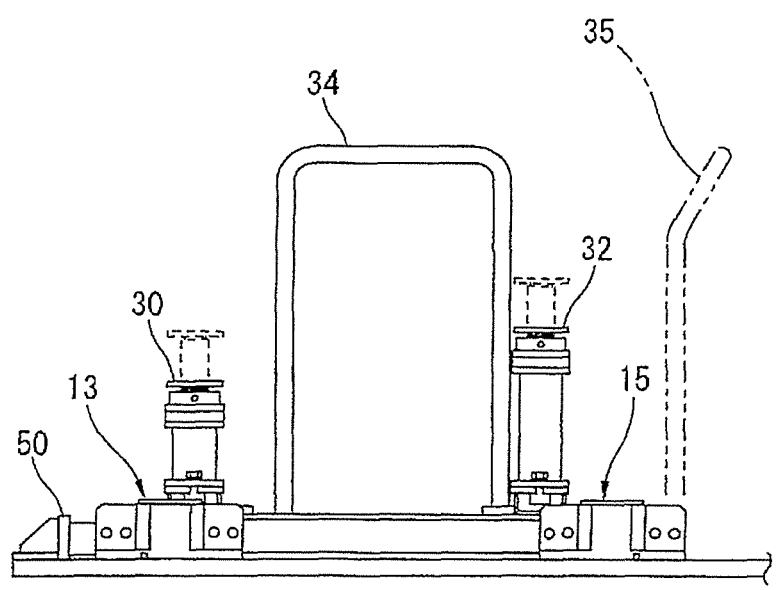
FIG. 3 is a side view of the carriage.

Following is explanation on embodiment(s) of the present invention with reference to the drawings. As shown in FIGS. 1 and 2, an engine test apparatus or system 1 according to the present invention is arranged to perform an engine performance test by carrying an engine (not shown) as a test object to be tested, to the position of a dynamometer 4 as a testing device, with a carriage or cart 2 carrying the engine and moving on a railway 3 of a pair of rails.

Figure 6:
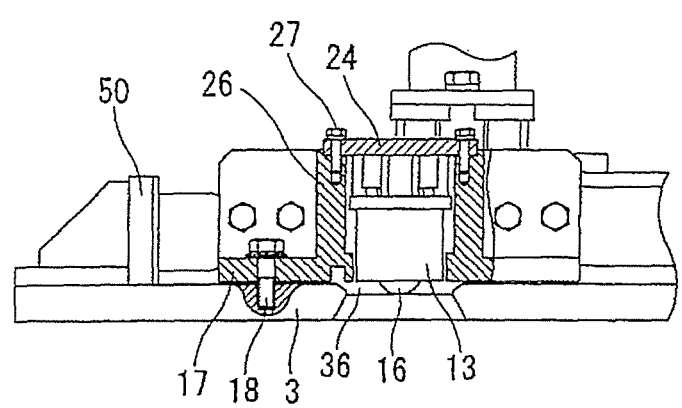
FIG. 6 is a sectional view similar to FIG. 5, in the state in which the carriage is fixed with a fixing portion.

The carriage 2 includes a base 11 on which the engine is to be mounted, first through fourth casters 12~45 attached to four corners of base 11, and fixing portion or portions 17 for positioning and fixing the base 11 on the rails of railway 3. As shown in FIG. 6, the fixing portion 17 is fixed to the rails of railway 3, by screw fastener(s) 18, for example.

Figure 7:
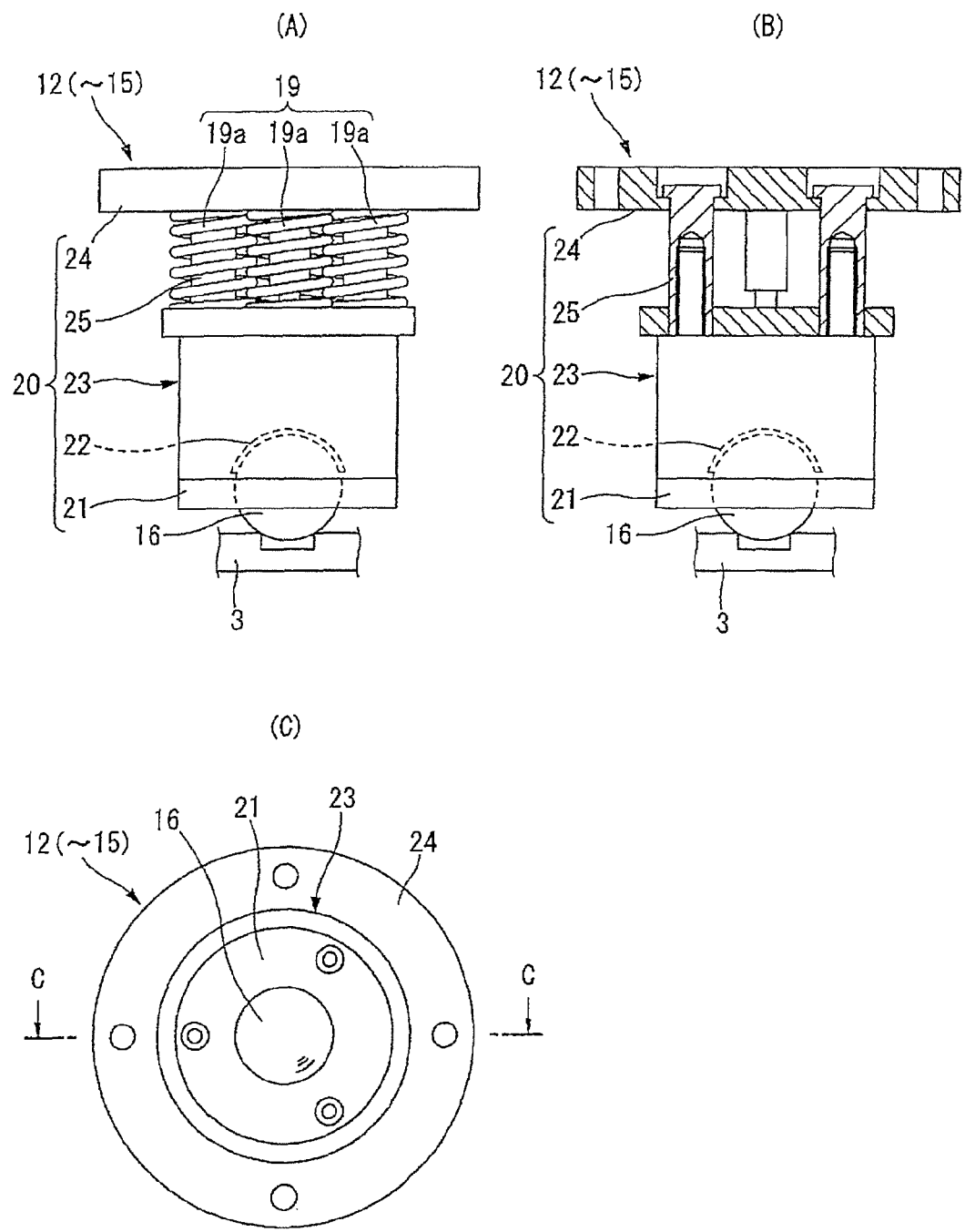
FIG. 7 shows the caster. (A) is a side view, (B) is a bottom view and (C) is a sectional view taken across a line C-C in (B).

As shown in FIG. 7, each of the casters 12~15 includes an elastic member 19, which is made up of a plurality of coil springs 19a. A wheel 16 is in the form of a sphere such as a steel ball. The wheel 16 is attached rotatably through a wheel holder 20, to the base 11.

The wheel holder 20 includes a wheel mounting portion 21 supporting the wheel 16 mounted on the wheel mounting portion 21 in a state in which a lower part of the wheel 16 projects downwards, a wheel holding portion 23 which is mounted on the wheel mounting portion 21 and which is arranged to hold the wheel 16 rotatably by pressing an upper part of the wheel 16 with a bearing 22, a base attaching portion 24 attaching or fixing the wheel holding portion 23 to the base 11, and a connecting member 25 which is interposed between the base attaching portion 24 and the wheel holding portion 23 and which is arranged to connect the base attaching portion 24 and the wheel holding portion 23 in a movable manner in a direction enabling approach and separation between the base attaching portion 24 and the wheel holding portion 23.

The elastic member 19 is interposed between the base attaching portion 24 and the wheel holding portion 23 in the state in which the connecting member 25 is surrounded by and fit in the elastic member 19.

At the time of fixing the fixing portion 17 to a rail of railway 3 with the screw fastener 18, the elastic member 19 is compressed when the wheel 16 is pressed on the rail of railway 3 by a pressing force greater than a predetermined value, and arranged to form a structure enabling the wheel 16 to rise with respect to the base 11, and alleviating pressure applied by fastening with a fastener such as the screw fastener, between wheel 16 and the rail of railway 3.

Figure 4:
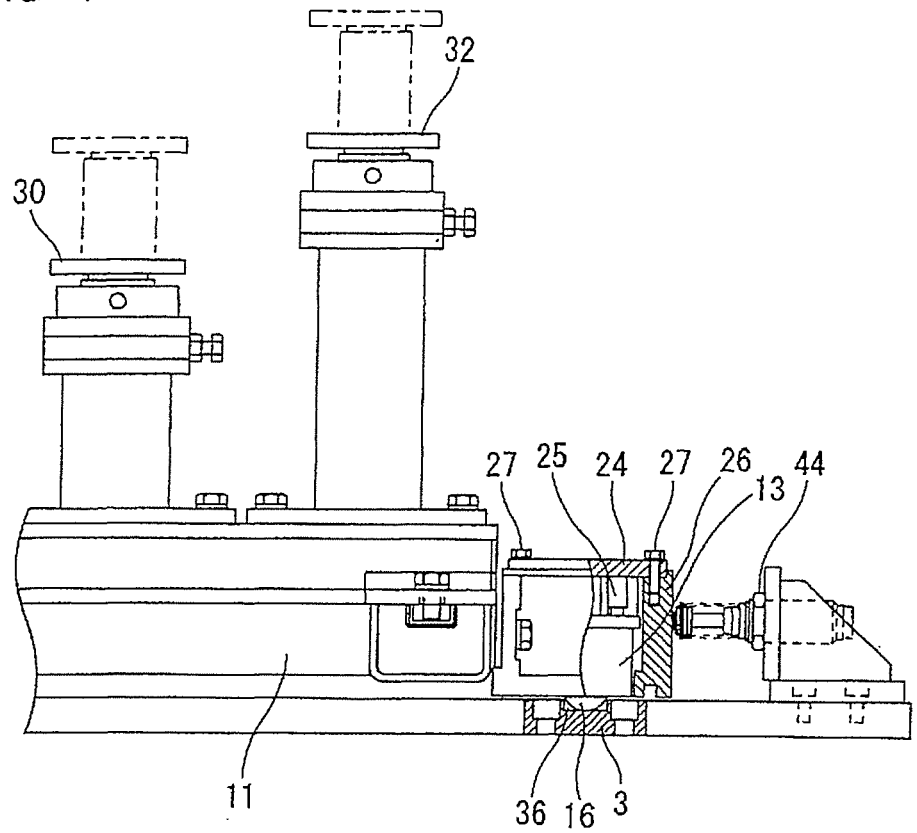
FIG. 4 is an enlarged sectional view of a portion around a caster in FIG. 2.
Figure 5:
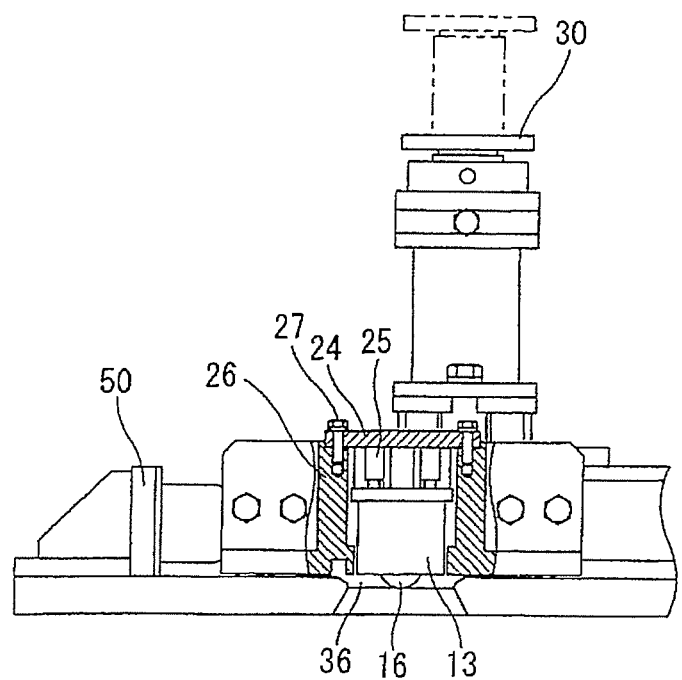
FIG. 5 is an enlarged sectional view of a portion around the caster in FIG. 3.

As shown in FIGS. 4~6, the casters 12~15 are installed, respectively, in caster receiving portions 26 provided at the front left and right corners and the rear left and right corners of the base. Each of casters 12~15 is installed in the caster receiving portion 26 by fastening the base attaching portion 24 to the caster receiving portion 26 by screw fastener(s) 27.

As shown in FIG. 1, the base 11 is in the form of a rectangular frame having a center open portion 28. As shown in FIG. 2, the base 11 is provided with first through fourth stands 29~32. Each of these four stands 29~32 is arranged to enable adjustment of its height.

The first through fourth stands 29~32 are arranged to move along stand rails 33 formed in the shape of a frame in the frame of base 11, as shown in FIG. 1, so that the distances among stands 29~32 are adjustable in conformity with the size and shape of the engine. Carriage 2 is further provided with handles 34 and 35 for pushing or drawing carriage 2 by hand.

Figure 8:
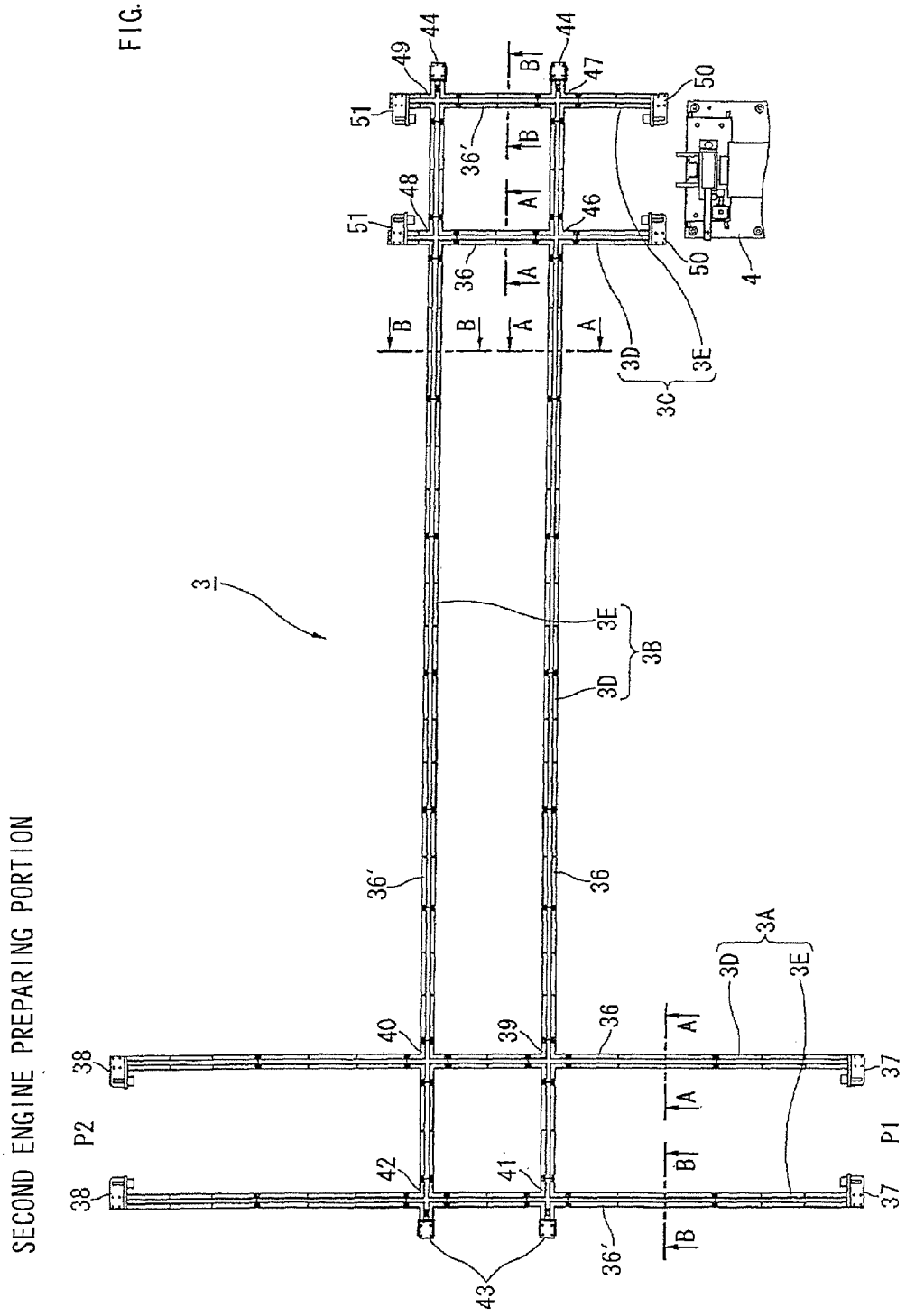
FIG. 8 is a plan view of rails.

The railway 3 for allowing the movement of carriage 2 is constructed as shown in FIG. 8. The railway 3 shown in FIG. 8 includes first, second and third railway tracks or railway sections 3A, 3B and 3C each of which is constituted by a left and right pair of rails 3D and 3E. On the upper surface of each rail 3D or 3E, there is formed a rail groove 36 or 36' having a recessed section for receiving the lower end of wheel 16.

Figure 9:
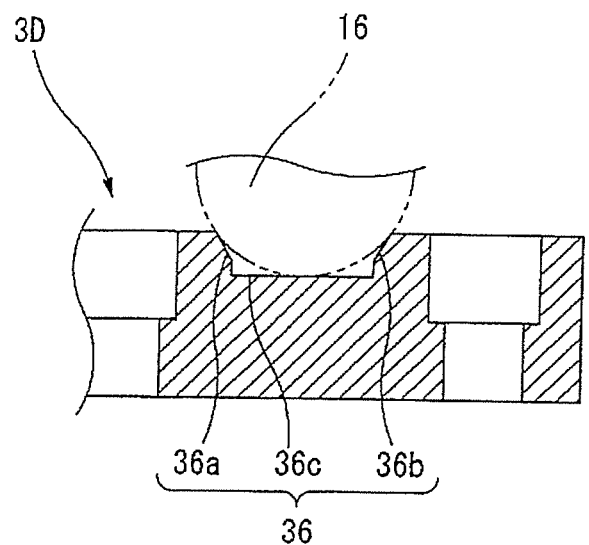
FIG. 9 is a sectional view taken across a line A-A in FIG. 8.

As shown in FIG. 9, the rail groove 36 of the rail 3D on one of the left and right sides is defined between confronting inside wall surfaces 36a and 36b which are inclined to form sloping surfaces such that the distance or width between the confronting inside wall surfaces 36a and 36b becomes smaller toward a bottom surface 36c of the rail groove 36. When the wheel 16 is inserted in the rail groove 36, the wheel 16 is supported by the confronting sloping inside wall surfaces 36a and 36b.

Figure 10:
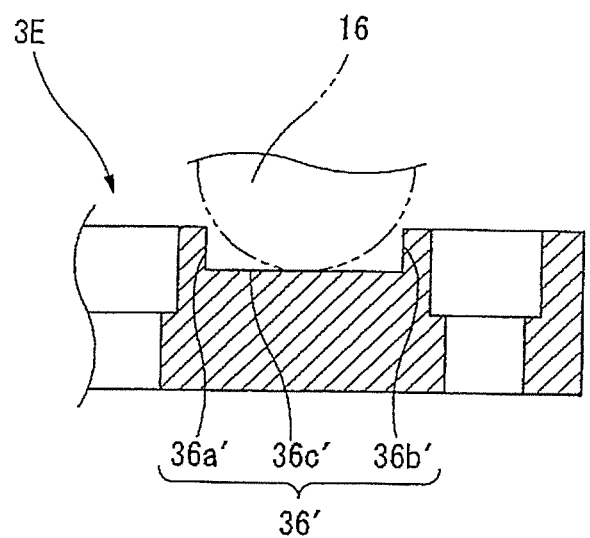
FIG. 10 is a sectional view taken across a line B-B in FIG. 8.
Figure 11:
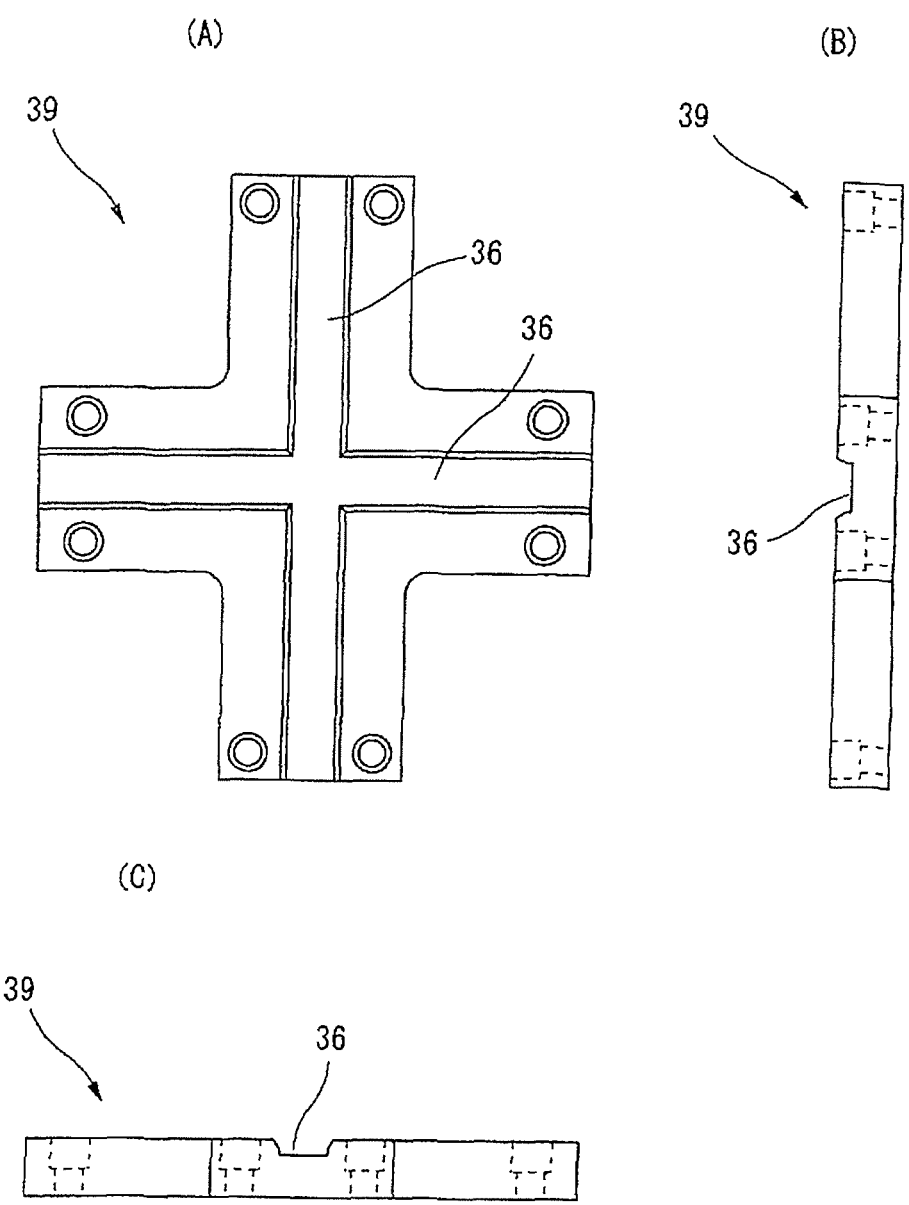
FIG. 11 shows a first joint member. (A) is a plan view, (B) is a front view and (C) is side view.
Figure 12:
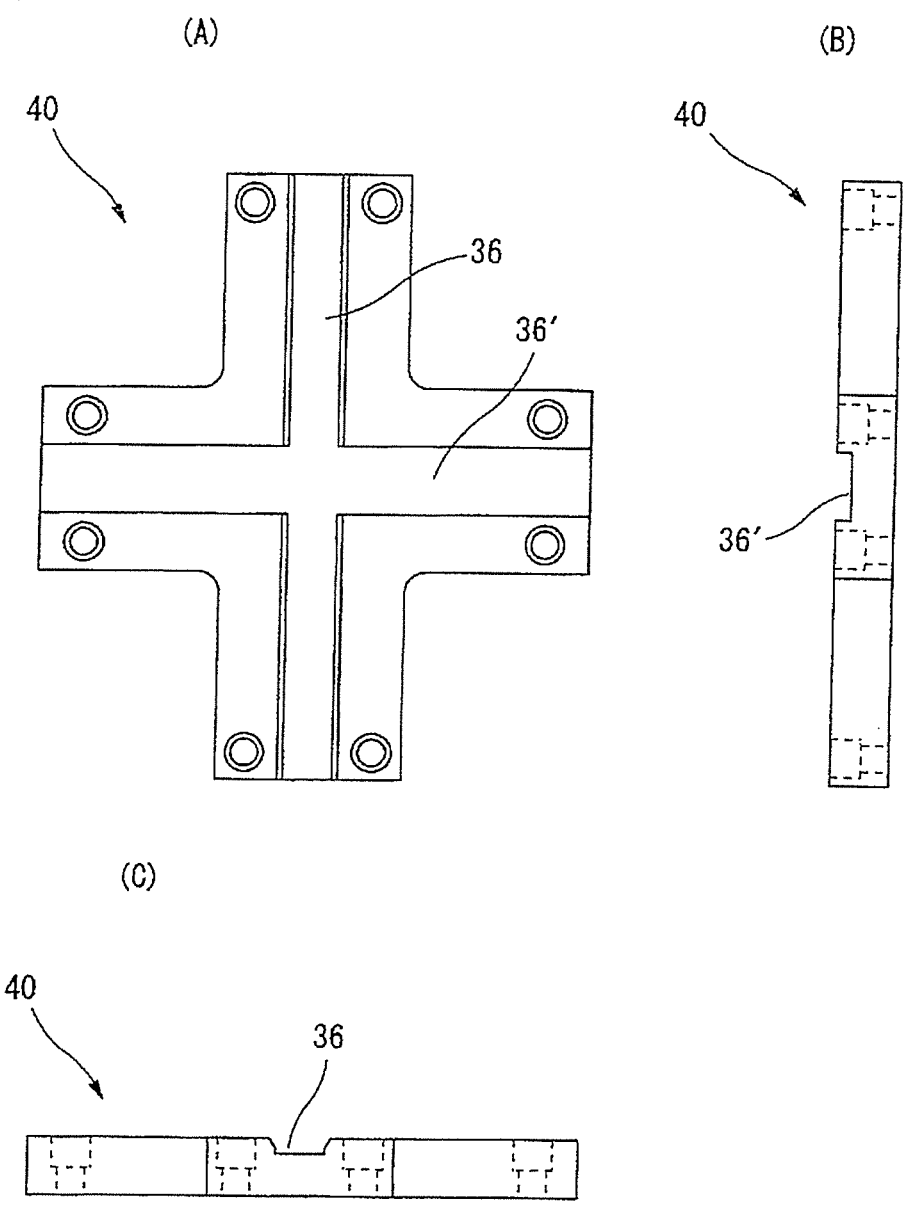
FIG. 12 shows a second join member. (A) is a plan view, (B) is a front view and (C) is side view.
Figure 13:
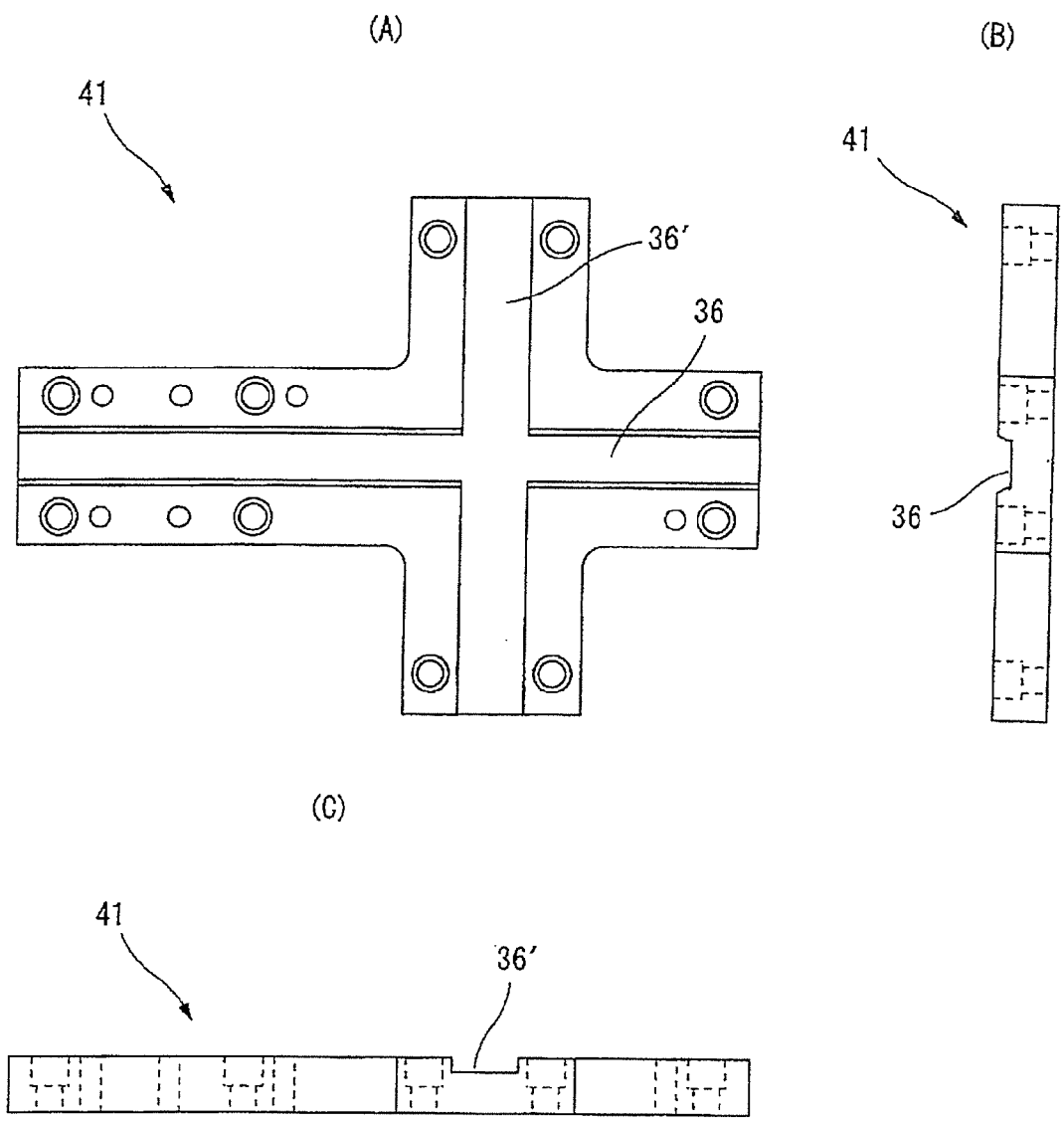
FIG. 13 shows a third joint member. (A) is a plan view, (B) is a front view and (C) is side view.
Figure 14:
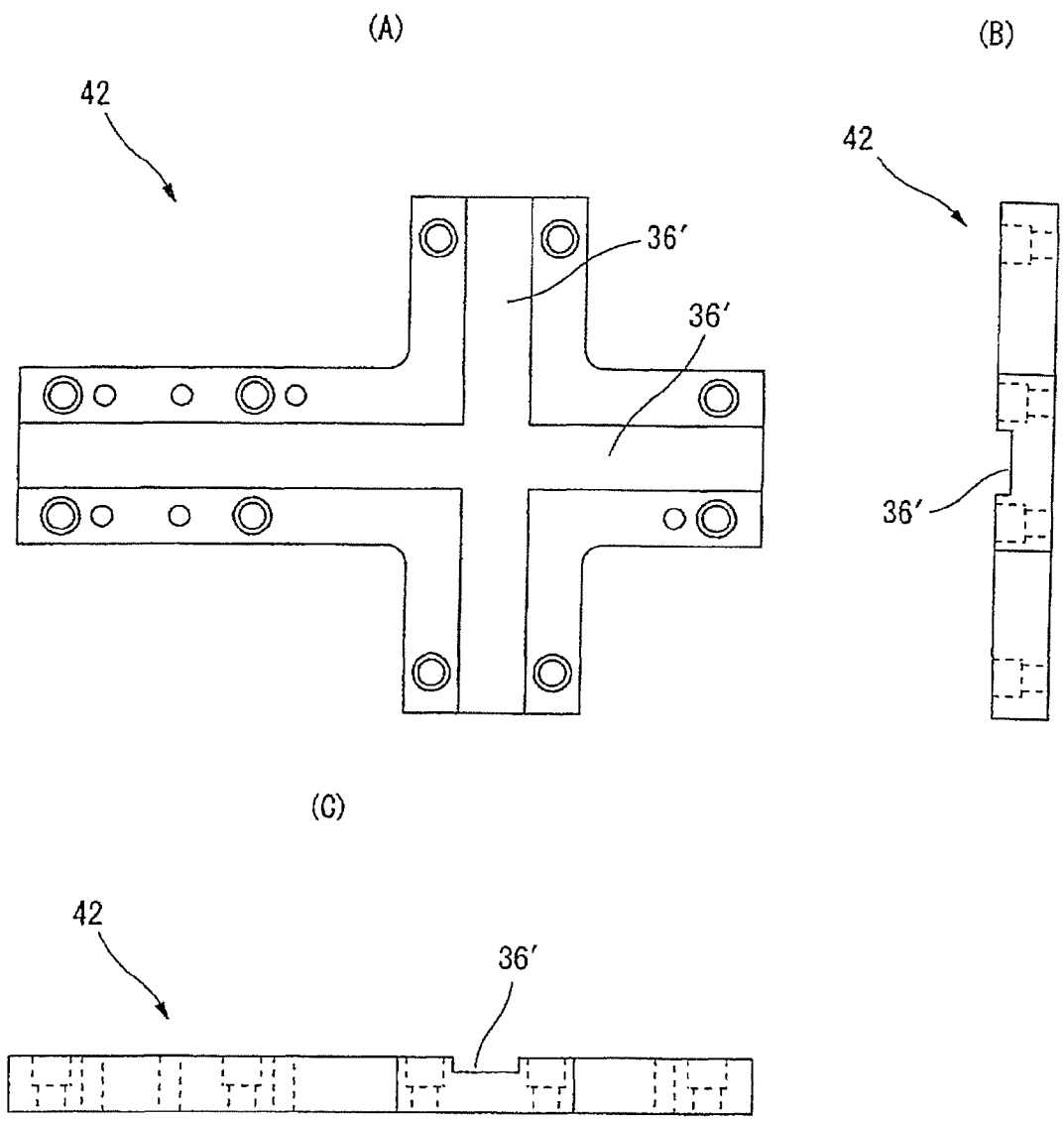
FIG. 14 shows a fourth joint member. (A) is a plan view, (B) is a front view and (C) is side view.
Figure 15:
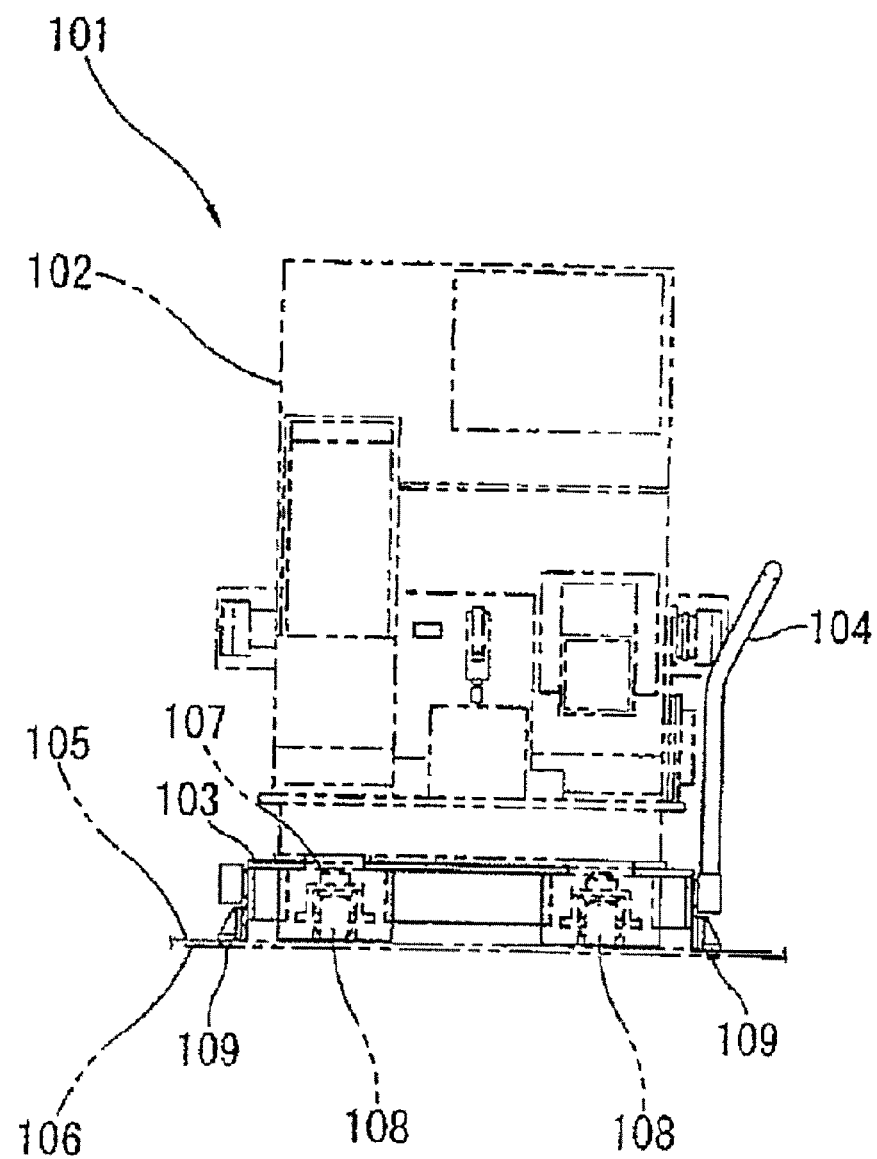
FIG. 15 is a view for illustrating a prior technology.

As shown in FIG. 10, the rail groove 36' of the rail 3D on the other of the left and right sides is defined between confronting inside wall surfaces 36a' and 36b' which are perpendicular to a bottom surface 36c' of the rail groove 36', and the rail groove 36' is so arranged that at least one of inside wall surfaces 36a' and 36b' is held in a noncontact state with the wheel 16 inserted in rail groove 36'. The bottom surfaces 36c and 36c' of rail grooves 36 and 36' of rails 3D and 3E are formed at the same height.

The rail grooves 36 and 36' of rails 3D and 3E are formed unequal so that the inside wall surfaces 36a and 36b of first rail groove 36 are inclined whereas the inside wall surfaces 36a' and 36b' of second rail groove 36' are vertical, in order to position the wheel 16 preferentially with the sloping inside wall surfaces 36a and 36b of rail groove 36 of first rail 3D. In the case of the arrangement in which the both rail grooves 36 and 36' of the paired rails 3D and 3E are formed equally with confronting inclined inside wall surfaces, the rail grooves 36 and 36' of the left and right rails 3D ad 3E would compete with each other and eventually make it difficult to position the wheel.

The three railway tracks 3A~3C are constructed as follows.

As shown in FIG. 8, the first railway track 3A includes a first end portion extending to a first engine preparing position P1 and a second end portion extending to a second engine preparing position P2.

At the first and second ends of first railway track 3A, there are provided stoppers 37 and 38 for stopping the carriage 2 at the engine preparing positions.

Second railway track 3B meets the middle of first railway track 3A at right angles.

As shown in FIG. 8, at the intersection between first railway track 3A and second railway track 3B, there are provided first through fourth joint members 39~42.

Each of first through fourth joint members 39~42 is a cross-shaped member including two rail grooves crossing each other at a center portion, as shown in FIGS. 11~14.

Second railway track 3B guides the carriage 2 carrying an engine to be tested, to the position of third railway track 3C, and guides the carriage 2 carrying the engine after the test, to first railway track 3A.

Shock absorbing stoppers 43 equipped with shock absorbers are provided at a first end of second railway track 3B on the first railway track's side, and arranged to stop the wheels 16 of carriage 2 carrying the engine after the test to the first railway track 3A, at the positions of the rail grooves of rails 3D and 3E constituting first railway track 3A. Furthermore, shock absorbing stoppers 44 equipped with shock absorbers are provided at a second end of second railway track 3B on the third railway track's side, and arranged to stop the wheels 16 of carriage 2 at the positions of the rail grooves of rails 3D and 3E of third railway track 3C.

Third railway track 3C meets second railway track 3B at right angles at an end portion of second railway track 3B opposite to the end portion on the first railway track's side.

At the intersection, the second railway track 3B and third railway track 3C are connected through fifth through eighth joint members 46~49.

Fifth through eighth joint members 46~49 are constructed substantially in the same manner as the first through fourth joint members 39~42.

Third railway track 3C guides the carriage 2 carrying an engine to the position for connection with the dynamometer 4. At the end of third railway track 3C near dynamometer 4, there are provided stoppers 50 to stop the carriage 2 at the position to connect the engine with dynamometer 4. At the other end of third railway track 3C on the opposite side, there are provided stoppers 51 to stop the wheels of carriage 2 at the positions of rail grooves 36 of rails 3D and 3E of second railway track 3B.

The above-mentioned railway 3 is disposed in anechoic chamber to perform a test of engines in an anechoic space. Especially, in the case of a fully anechoic chamber, the floor as well as the side walls and ceiling is covered with sound insulating material. Since the sound insulting material such as form plastic is weak in mechanical strength, it is difficult to lay rails directly on the floor. Therefore, the railway 3 is laid on a beam structure or truss placed or bridged over the floor of the anechoic chamber. Steel sheet or plate, when used as the beam structure, is liable to reflect sound and radio wave. Therefore, the beam structure is made by the use of steel plate or sheet covered with sound absorbing material, net-like or ramified steel plate or sheet, or performed steel sheet or plate formed with many holes.

The engine test apparatus according to the present invention is used according to a following using method. First, carriages are set, respectively, at the first and second engine preparing positions P1 and P2 at both ends of the first railway track 3A shown in FIG. 8. (Hereinafter, the carriage set at the first engine preparing position P1 is referred to as first carriage, and the carriage set at the second engine preparing position P2 is referred to as second carriage.) Then, an engine is mounted on each of the first and second carriages.

After the engine is mounted on the first carriage 2, for example, the first carriage 2 is moved toward the middle of first railway track 3A. At the crossing at the middle of first railway track 3A, the wheels 16 of firth through fourth casters 12~15 provided at the four corners of first carriage 2 enter the open portions at the intersections of rail grooves of first through fourth joint members 46~49, and hence the first carriage 2 is brought in a state capable of changing the direction of movement.

Accordingly, the moving direction of first carriage 2 is changed by 90°, and the first carriage 2 is moved along the second railway track 3B toward the third railway track 3C. At the crossing between second railway track 3B and third railway track 3C, the wheels 16 of firth through fourth casters 12~15 of first carriage 2 enter the open portions at the intersections of rail grooves of fifth through eighth joint members 46~49, and hence the first carriage 2 is brought in the state capable of changing the direction of movement.

Accordingly, the moving direction of first carriage 2 is changed by 90°, and the first carriage 2 is moved along the third railway track 3C toward dynamometer 4, to the position where first carriage 2 abuts against the stoppers 50, for connection with the dynamometer. Then, first carriage 2 is fixed onto the rails of railway 3 with screw fastener or fasteners 18 and fixing portion or portions 17.

When the fastening force at the time of fastening the fixing portion 17 to the rail with screw fastener 18 exceeds the spring force of elastic member 19, the elastic member 19 contracts, raises the wheel 16 with respect to the base 11, mitigates the force pressing the wheel 16 onto the rail of railway 3, and thereby protects the wheel 16 and the rail of railway 3.

In the state in which first carriage 2 is fixed, the engine is connected with dynamometer 4 and various tests are performed. Specifically, in the case of testing in the anechoic chamber, the open portion formed at the center in the rectangular frame of base 11 is effective for eliminating reflection of sound etc. and enabling accurate measurement.

After the test, the fixing by fixing portion 17 is cancelled. Accordingly, the elastic member 19 expands from the compressed state, and raises the base 11 from the rails, so that the first carriage 2 is returned to the movable state.

Then, the first carriage 2 is returned through the third railway track 3C, second railway track 3B and first railway track 3A, to the first engine preparing position P1, and the tested engine is transferred to the outside.

When the first carriage 2 is returned to the first engine preparing position P1, the second carriage 2 waiting at the second engine preparing position P2 with an engine mounted on the second carriage 2 is moved to the testing position P3 and subjected to the engine test. After the test, the second carriage 2 is returned to the second engine preparing position P2, and the engine is transferred to the outside.

During the testing operation of engine mounted on second carriage 2, a next engine is mounted on the first carriage 2 at the first engine preparing position P1.

When the second carriage 2 is returned to the second engine preparing position P2, the first carriage 2 is moved again to the testing position P3 and the engine test is performed. By repeating these operations, engines are tested continuously. This embodiment employs the structure fixing the fixing portion 17 to the rail with the screw fastener 18. However, it is possible to employ a structure fixing the fixing portion 17 to the rail by the use of cam mechanism or the like.

The invention claimed is:

1. An engine test apparatus for performing an engine performance test, comprising:
   a dynamometer;
   a pair of rails; and
   a carriage for conveying an engine, along the rails, to a test position adjacent to the dynamometer, the carriage comprising:
     a base arranged to support the engine as a test object to be tested,
     a caster which is attached to the base and which includes a spherical wheel adapted to roll along one of the rails and a wheel holder though which the spherical wheel is attached rotatably to the base, and
     a fixing portion arranged to position the base on the rails and fix the base,
     the caster further including an elastic member arranged to be compressed when the base is fixed by the fixing portion,
     wherein the wheel holder includes:
       a wheel mounting portion supporting the spherical wheel placed on the wheel mounting portion in a state in which a lower part of the spherical wheel projects;
       a wheel holding portion which is attached, at a lower part of the wheel holding portion, on the wheel mounting portion and which is arranged to hold the spherical wheel rotatably by pressing an upper part of the spherical wheel with a bearing;
       a base attaching portion attaching the wheel holding portion to the base; and
       a connecting member which is provided between the base attaching portion and the wheel holding portion and which is arranged to connect the base attaching portion and the wheel holding portion in a movable manner enabling movement in a direction of approach and separation between the base attaching portion and the wheel holding portion,
     wherein the elastic member is disposed between the base attaching portion and the wheel holding portion.

2. The engine test apparatus as claimed in claim 1, wherein the wheel holder is arranged to hold the wheel so that the wheel is withdrawn into the wheel holder when the elastic member is compressed at a time of fixing the base by the fixing portion.

3. An engine test apparatus for performing an engine performance test, comprising:
   a dynamometer;
   a pair of rails; and
   a carriage for conveying an engine, along the rails, to a test position adjacent to the dynamometer, the carriage comprising:
     a base arranged to support the engine as a test object to be tested,
     a caster which is attached to the base and which includes a spherical wheel adapted to roll along one of the rails and a wheel holder though which the spherical wheel is attached rotatably to the base, and
     a fixing portion arranged to position the base on the rails and fix the base,
     the caster further including an elastic member arranged to be compressed when the base is fixed by the fixing portion,
       wherein each of the rails includes a rail groove to receive a lower part of the spherical wheel, and the rail groove of one of the rails in the pair includes confronting side walls formed with sloping surfaces arranged such that the spherical wheel inserted in the rail groove is in contact with each of the sloping surfaces.

4. The engine test apparatus as claimed in claim 3, wherein the rail groove of the other of the rails in the pair includes confronting side walls formed with upright surfaces.

5. An engine test apparatus for performing an engine performance test, comprising:
   a dynamometer;
   a pair of rails; and
   a carriage for conveying an engine, along the rails, to a test position adjacent to the dynamometer, the carriage comprising:
     a base arranged to support the engine as a test object to be tested,
     casters each of which is attached to the base and each of which includes a spherical wheel adapted to roll along a rail groove of one of the rails, and
     a fixing portion arranged to position the base on the rails and fix the base at the test position in a state in which the spherical wheels are placed, respectively, on the rails,
   each caster further including an elastic member arranged to be compressed when the base is fixed by the fixing portion for alleviating a pressure applied between the spherical wheel and the rail,
   wherein the fixing portion is pressed downwards onto one of the rails at the time of fixing the base to the rails.

6. The engine test apparatus as claimed in claim 5, wherein a caster is provided at each of front left and right corners and rear left and right corners of the base.

7. The engine test apparatus as claimed in claim 5, wherein the base is in a form of a rectangular frame having a center open portion.

8. The engine test apparatus as claimed in claim 5, wherein the rails are provided in an anechoic chamber for performing a test of the engine in an anechoic space.

9. The engine test apparatus as claimed in claim 5, wherein the fixing portion is fixed to one of the rails by a screw fastener.

10. The engine test apparatus as claimed in claim 5, wherein the engine test apparatus further comprises a railway structure including a plurality of railway sections each constituted by a left and right pair of rails for allowing movement of the carriage through the spherical wheels, and joint members arranged to guide the spherical wheels of the carriage from the rails of a first one of the railway sections to the rails of a second one of the railway sections crossing the first one of the railway sections.

11. The engine test apparatus as claimed in claim 5, wherein the elastic member of each caster includes at least one coil spring set to be compressed when the spherical wheel of the caster is pressed against a rail under the spherical wheel with a pressing force greater than or equal to a predetermined value by a fastening device for fastening the fixing portion to the rail.

12. The engine test apparatus as claimed in claim 5 wherein the rail groove of each of the rails is arranged to receive a lower part of the spherical wheel, and the rail groove of one of the pair of rails is defined between sloping side wall surfaces which confront each other and which are arranged such that the spherical wheel inserted in the rail groove is in contact with each of the sloping side wall surfaces.

13. The engine test apparatus as claimed in claim 12, wherein the rail groove of the other of the pair of rails includes confronting side wall surfaces which are arranged such that at least one of the confronting side wall surfaces is held out of contact with the spherical wheel inserted in the rail groove.

14. The engine test apparatus as claimed in claim 13, wherein the rail groove of each of the pair of rails includes a bottom surface, and the bottom surfaces of the rail grooves of the rails are flush with each other.

\* \* \* \* \*